C. W. KOERTNER.
DUST PAN.
APPLICATION FILED MAR. 3, 1910.
958,255.
Patented May 17, 1910.
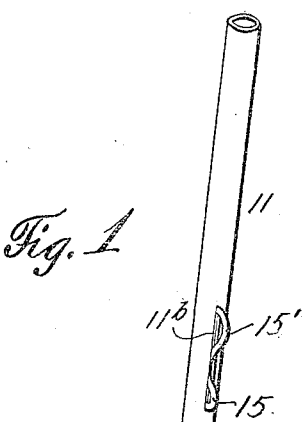
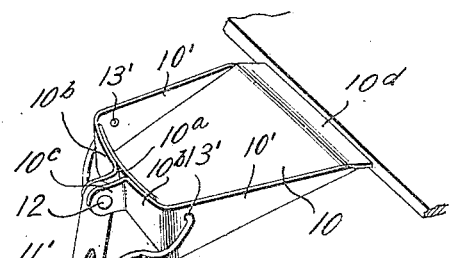
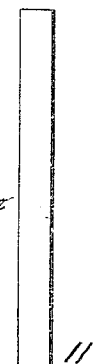
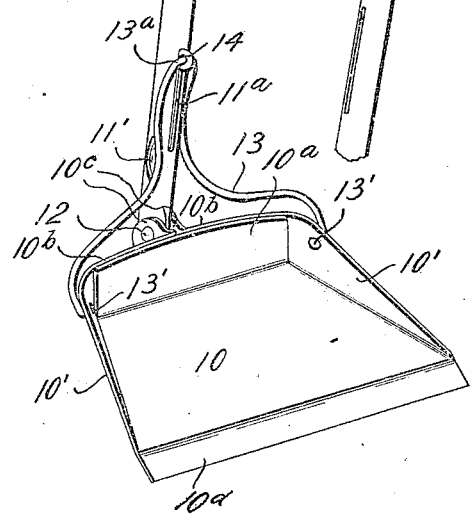
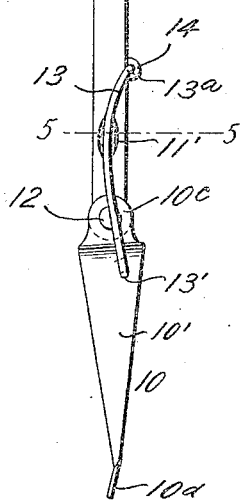
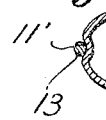
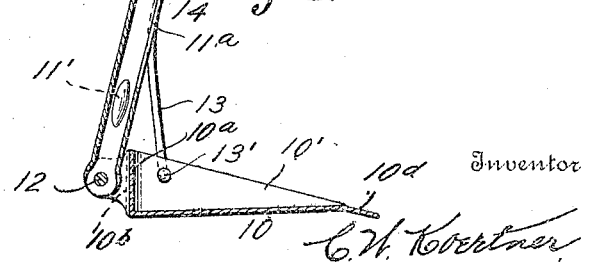
Witnesses
E. Larson
M. J. Taylor
Inventor
C. W. Koertner,
By Beeler & Robb
Attorneys

UNITED STATES PATENT OFFICE.

CONRAD W. KOERTNER, OF PEARL CITY, ILLINOIS.

DUST-PAN.

958,255.  Specification of Letters Patent. Patented May 17, 1910.

Application filed March 3, 1910. Serial No. 547,041.

*To all whom it may concern:*

Be it known that I, CONRAD W. KOERTNER, a citizen of the United States, residing at Pearl City, in the county of Stephenson and State of Illinois, have invented certain new and useful Improvements in Dust-Pans, of which the following is a specification.

This invention relates to dust pans, and has particular reference to a device of this character which is not only simple in construction and easy of operation but is adapted for certain novel functions and modes of operation, all of which will be hereinafter more fully described and claimed, and illustrated in the accompanying drawings, in which—

Figure 1 is a perspective view of the device shown in its normal position in operation upon the floor; Fig. 2 is a similar view of the device arranged as when being held to receive sweepings from an elevated shelf or the like; Fig. 3 is a side elevation of the device in the position the several parts may assume when stood away out of use; Fig. 4 is a vertical sectional view of the device in operative position as when upon the floor, and Fig. 5 is a transverse sectional detail on the line 5—5 of Fig. 3.

Throughout the following description and on the several figures of the drawings similar parts are referred to by like reference characters.

The invention comprises a pan proper 10, adapted to receive dust or sweepings in the usual manner, and to the pan is pivotally connected a handle 11. The end of the handle is connected to the pan by means of a pivot 12 whereby the handle and pan may partake of relative rotation through an angle of approximately 180°. Bracing means are employed between the handle and pan, such means including a bail 13, the ends of which are pivotally connected at 13' with the side members 10' of the pan. The intermediate portion of the bail is bent to form a loop 13ª pivotally connected to an eye 14 of a catch member 15, slidable to and fro along the handle in any convenient manner. The portions of the bail between the loop 13ª and the ends coöperate with the handle 11 in a peculiar manner, whereby when in the position shown in Fig. 3 the bail will grip the handle so as to hold the handle and pan in extended position, or in other words on the dead center, the gripping effect being sufficient to enable the device to be set away for convenience in a narrow place, without any danger of the parts turning relatively to each other upon the pivot. As shown the said portions of the bail 13 are so formed as to snap into depressions 11' in the sides of the handle so that the parts are held in the manner above described by a certain frictional engagement which is strong enough for the purposes mentioned and yet not so great as to prevent the pan to be turned on the pivot 12 to set it for ordinary operation. By placing the edge of the pan upon the floor and pressing downwardly upon the handle to break the joint and disconnect the bail from the depressions the device will assume readily the position indicated in Fig. 4. The eye 14 of the catch member is adapted to slide along a slot 11ª in the handle and the upper portion of the catch member is formed into a finger-piece 15' so that the catch will be pressed inwardly to release it from the end of the slot 11ᵇ in order to permit the pan to swing on its pivot for the purpose of dumping its contents and for it to assume the position illustrated in Fig. 3.

The pan 10 is preferably made of sheet metal which may be formed of a single blank by a die or otherwise so as to form in addition to the side members 10' a rear wall 10ª which is bent upward substantially at a right angle to the bottom and held embraced in such position by extensions 10ᵇ of the side members which extend across the back portion of the pan to form the ears 10ᶜ to which the handle is pivoted. This provides a very simple and yet strong construction of pan. The front edge or lip 10ᵈ of the pan bottom may be bent downwardly as shown to facilitate the sweeping operation.

The device may be made of any suitable materials and the relative proportions of the parts may be varied as may be found desirable without departing from the invention claimed.

Having thus described the invention, what is claimed is:—

1. In a dust pan, the combination of a pan proper including side members and a rear wall, a hollow handle pivoted adjacent said rear wall and having depressions in its sides, a bail pivoted to the side members and adapted to grip the handle in said depressions in a certain position, and a catch connected to the bail and slidable along the interior of the handle to hold the bail and pan proper in another position with respect to the handle.

2. In a dust pan, the combination of a pan proper, said pan comprising a bottom, sides and a rear wall embraced by the extensions of the sides, a handle pivoted to said extensions of the sides in the rear of the rear wall, a bail pivoted to the side members of the pan proper and adapted to grip the sides of the handle in a certain position, and a catch connected to the bail and slidable along the handle to hold the bail and pan proper in another position with respect to the handle.

In testimony whereof I affix my signature in presence of two witnesses.

CONRAD W. KOERTNER.

Witnesses:
O. S. PENTICOFF,
A. L. HURD.